US012372146B1

(12) United States Patent
Kenmotsu et al.

(10) Patent No.: US 12,372,146 B1
(45) Date of Patent: Jul. 29, 2025

(54) SUB-ASSEMBLY FOR E-AXLE

(71) Applicant: GKN Automotive Limited, Birmingham (GB)

(72) Inventors: Kazuto Kenmotsu, Tochigi (JP); Masashi Aikawa, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/660,312

(22) Filed: May 10, 2024

(30) Foreign Application Priority Data

Jan. 18, 2024 (JP) ................. 2024-006031

(51) Int. Cl.
*F16H 48/34* (2012.01)
*B60K 1/00* (2006.01)
*F16H 48/08* (2006.01)
*F16H 48/22* (2006.01)
*F16H 48/295* (2012.01)
*F16H 57/031* (2012.01)

(52) U.S. Cl.
CPC ........ *F16H 48/22* (2013.01); *B60K 2001/001* (2013.01); *F16H 48/08* (2013.01); *F16H 48/295* (2013.01); *F16H 2048/343* (2013.01); *F16H 57/031* (2013.01)

(58) Field of Classification Search
CPC ........ F16H 48/22; F16H 48/295; F16H 57/02; F16H 57/021; F16H 57/031; F16H 57/037–038; F16H 2057/02052; F16H 48/08–2048/087; F16H 48/34–2048/343; F16H 2057/02034; B60K 2001/001
See application file for complete search history.

(56) References Cited

U.S. PATENT DOCUMENTS

| 6,401,850 B1 * | 6/2002 | Bowen ................ B60K 6/26 903/910 |
| 10,221,899 B2 * | 3/2019 | Moubarak ............ F16H 25/186 |
| 10,228,049 B2 * | 3/2019 | Peura .................. F16H 57/0473 |
| 10,234,009 B2 * | 3/2019 | Imafuku ................ F16H 48/08 |
| 10,288,160 B2 * | 5/2019 | Guarino ................ F16H 48/22 |

FOREIGN PATENT DOCUMENTS

| JP | 2020046065 A | * | 3/2020 |
| JP | 2022527554 A | | 6/2022 |
| WO | 2021004780 A1 | | 1/2021 |

* cited by examiner

*Primary Examiner* — James J Taylor, II
(74) *Attorney, Agent, or Firm* — Reising Ethington P.C.

(57) ABSTRACT

A sub-assembly for limiting differential motion to an eAxle with a differential for differentially outputting torque about an axis is provided. An actuator is configured to generate a rotational force about the axis. A cam mechanism is configured to convert the rotational force into a thrust force in a direction of the axis. A clutch assembly includes a first drum separably coupling with the differential, and a second drum separably coupling with a side gear of the differential, The clutch assembly is disposed adjacent to the cam mechanism so as to receive the thrust force to bring a friction clutch into action. A cover is configured to enclose the cam mechanism and the clutch assembly and couple with the eAxle to support any one of the cam mechanism and the clutch assembly against the thrust force.

11 Claims, 8 Drawing Sheets

US 12,372,146 B1

SUB-ASSEMBLY FOR E-AXLE

CROSS-REFERENCE TO RELATED APPLICATIONS

This application is based upon and claims the benefit of priority from Japanese Patent Application No. 2024-006031 (filed Jan. 18, 2024), the entire contents of which are incorporated herein by reference.

BACKGROUND

In the art field of vehicle power, it is being keenly studied to substitute electric motors for internal combustion engines. Torque generated by an electric motor is in general multiplied by a reduction gear set and then output to axles. A drive device thus includes a reduction gear set, an inverter and an electric motor, and is, when integrated as one device, referred to as an electric axle or an eAxle. Japanese Patent Application Laid-open No. 2022-527554 and International Patent Publication No. 2021/004780 disclose eAxles further including differentials for allowing differential motion between right and left axles.

Use of an eAxle facilitates assembly of a vehicle, because its unity is beneficial in handling the device as a whole and it nonetheless carries many components. Further, as compared with a combination of an internal combustion engine and a transmission, an eAxle is sufficiently compact and light-weight. These features contributes to increase of freedom in vehicle design and also improvement of energy efficiency.

Some problems would occur when one tried to add some functions to the eAxle. For example, addition of a function of mechanically intermitting torque transmission to axles requires incorporation of at least a clutch and an actuator for operating the clutch into the interior of the eAxle. This incorporation requires size increase of the eAxle in the axial direction and therefore necessitates design change about the vehicle body. In addition, because the eAxle is inherently axially long, and therefore laterally wide in regard to the vehicle body, sufficient lengths are hardly set aside in the vehicle body for right and left axles projecting both sides of the eAxle. Axial elongation of the eAxle thus requires shortening of the right and left axles, which leads to further shortening of pendulum lengths of the axles pivoting on these joints. This of course affects the ride quality of the vehicle. Or, addition of devices to the exterior of the eAxle would be possible but would even then require design change about the vehicle body if these devices were supported separately from support for the eAxle.

The art disclosed hereafter has been created in view of these issues.

SUMMARY

The disclosure herein relates to a sub-assembly that imparts a function for limiting differential motion to an eAxle.

According to an aspect, a sub-assembly for imparting a function of limiting differential motion to an eAxle with a differential for differentially outputting torque about an axis is provided with an actuator generating a rotational force about the axis; a cam mechanism converting the rotational force into a thrust force in a direction of the axis; a clutch assembly including a first drum separably coupling with the differential, and a second drum separably coupling with a side gear of the differential, the clutch assembly disposed so adjacent to the cam mechanism as to receive the thrust force to bring the friction clutch into action; and a cover so dimensioned as to enclose the cam mechanism and the clutch assembly and couple with the eAxle to support any one of the cam mechanism and the clutch assembly against the thrust force or a thrust reaction force.

DETAILED DESCRIPTION

Exemplary embodiments will be described hereinafter with reference to the appended drawings. Drawings are not necessarily made to scale and therefore it is particularly noted that dimensional relations are not limited to those drawn therein. Throughout the following descriptions and appended claims, unless otherwise described, an axis means a rotation axis commonly owned by a differential and the sub-assembly, and terms "radial" and "circumferential" are defined in regard to the axis. Further, for convenience of explanation, right and left are determined in regard to the direction of travel of the vehicle, whereas any embodiments would be of course possible where the right and the left were arbitrarily interchanged.

Figure 1A:
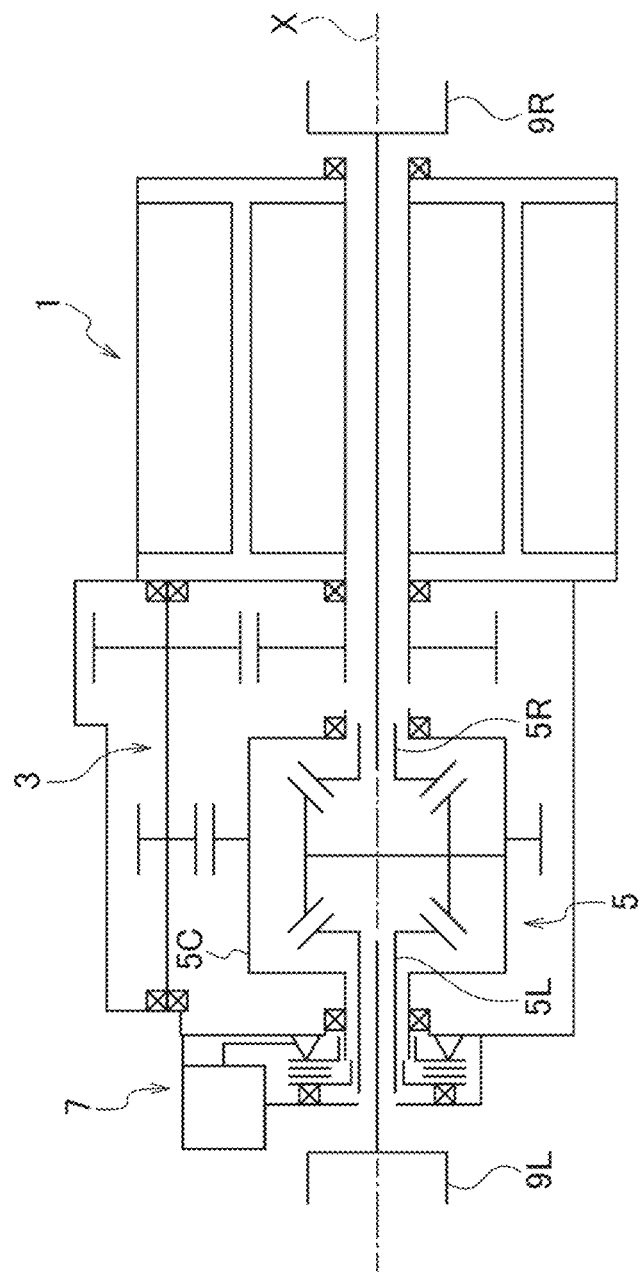
FIG. 1A is a block diagram of an exemplary eAxle including a sub-assembly that effects a function for limiting differential motion.
Figure 1B:
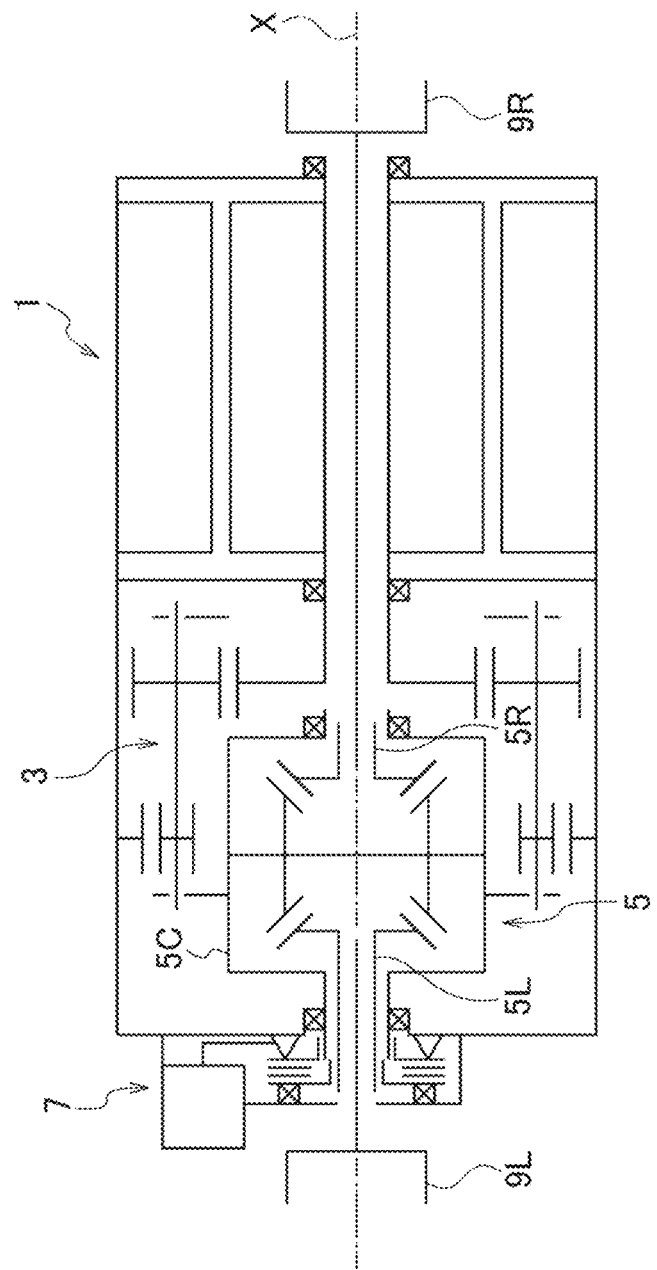
FIG. 1B is a block diagram of another exemplary eAxle.

Referring to FIGS. 1A and 1B, an eAxle including a differential is provided with an electric motor 1 generating torque in response to an output from an inverter, a reduction gear set 3 reducing its rotation and thereby multiplying the torque, and a differential 5 differentially distributing the multiplied torque to right and left axles 9R and 9L. The differential 5 is provided with a differential gear set of a bevel gear type for example in its interior to output the torque to right and left side gears 5R and 5L with allowing differential motion therebetween and further to the right and left axles 9R and 9L respectively coupled with the side gears 5R and 5L.

The electric motor 1 has a hollow output shaft and the right axle 9R passes through the hollow shaft and is led out to the exterior, thereby the electric motor 1 and the differential 5 are arranged coaxially. In this case, the reduction gear set 3 may be, as shown in FIG. 1A as an example, provided with an offset shaft. Or, a planetary gear set may be applied to the reduction gear set 3 as shown in FIG. 1B as an example, thereby the reduction gear 3 may be as well coaxial with the electric motor 1 and the differential 5.

As the differential 5 that could be used in a common eAxle cannot limit differential motion, when one of the right and left driving wheels loses traction, the differential 5 cannot output torque to the other as well. The sub-assembly 7, in combination with an eAxle including the differential 5, imparts a function of limiting differential motion to the eAxle. The sub-assembly 7 may be combined with any type of eAxle as far as the differential 5 is arranged at one end of the eAxle, and may, needless to say, be combined with either an off-set shaft type illustrated in FIG. 1A or a coaxial type illustrated in FIG. 1B.

Figure 2:
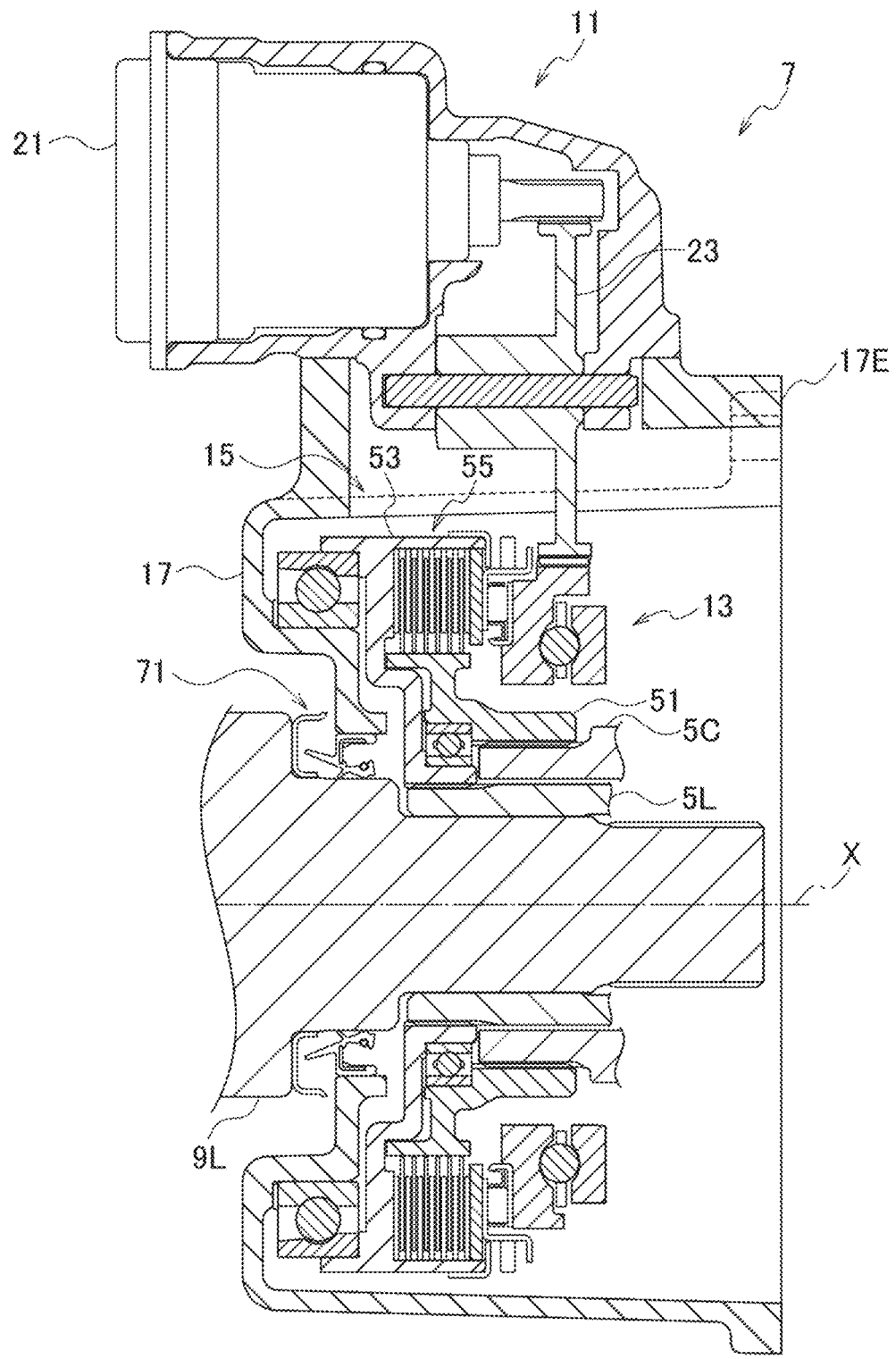
FIG. 2 is a sectional elevational view of the sub-assembly.

Referring mainly to FIG. 2 in combination with FIGS. 1A and 1B, the sub-assembly 7 is generally provided with an actuator 11 for controllably increasing and decreasing limiting force, a cam mechanism 13 acting in response to the input from the actuator 11, a clutch assembly 15 generating braking force in response to thrust force created by the cam mechanism 13, and a cover 17 accommodates and supports these components. At least the actuator 11 and the cam 13 are unitarily separable from and combinable with the differential 5, and the cover 17 at its end section 17E is coupled with a casing of the eAxle and then covers these components. To the actuator 11, for example, a combination of a motor 21 and a toothed wheel 23 in mesh with its shaft is applicable. The motor 21 may be fixed to the cover 17 and partly exposed to its exterior, whereas the toothed wheel 23 should be exposed to the interior of the cover 17 and there in mesh with the cam mechanism 13 to transmit the output of the motor 21 to the cam mechanism 13. Alternatively, if the motor 21 could exert a sufficient output, its shaft may be in itself provided with a toothed wheel and be in mesh with the cam mechanism 13. Still alternatively, the toothed wheel 23 and the cam mechanism 13 may in combination constitute a reduction gear, thereby multiplying the output from the motor 21. Further, in place of these structures, as will be described with reference to FIGS. 6B and 6D, the actuator 11 may be so constituted as to transmit its rotational motion directly to the cam mechanism 13. In any case, the actuator 11 generates a rotational force in the cam mechanism 13 about its axis.

Figure 3:
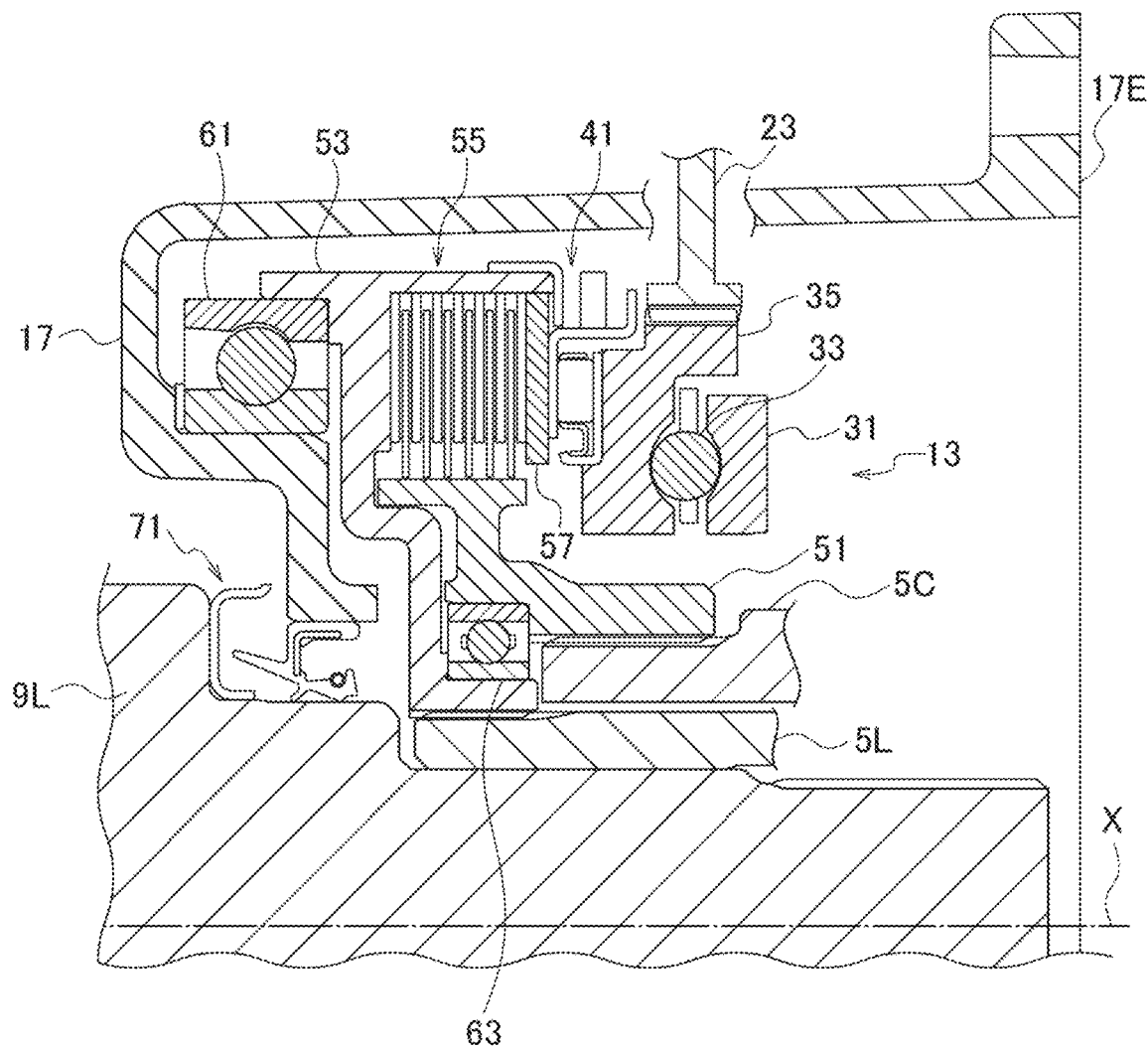
FIG. 3 is a sectional elevational view in which a part of the sub-assembly is enlarged based on one example.

Referring to FIG. 3 for example in combination with FIG. 2, the cam mechanism 13 is for example provided with a base member 31, cam balls 33, and a thrust member 35. The base member 31 and the thrust member 35 are both circular members around the axis X, and either or both of these members 31, 35 have grooves running in its circumferential direction. The cam balls 33 are put in between the members 31, 35 and roll over these grooves. These grooves form gradual slopes inclined to the circumferential direction and thereby the cam balls 33, by rolling over the grooves, push up or bring down the thrust member 35.

Figure 4:
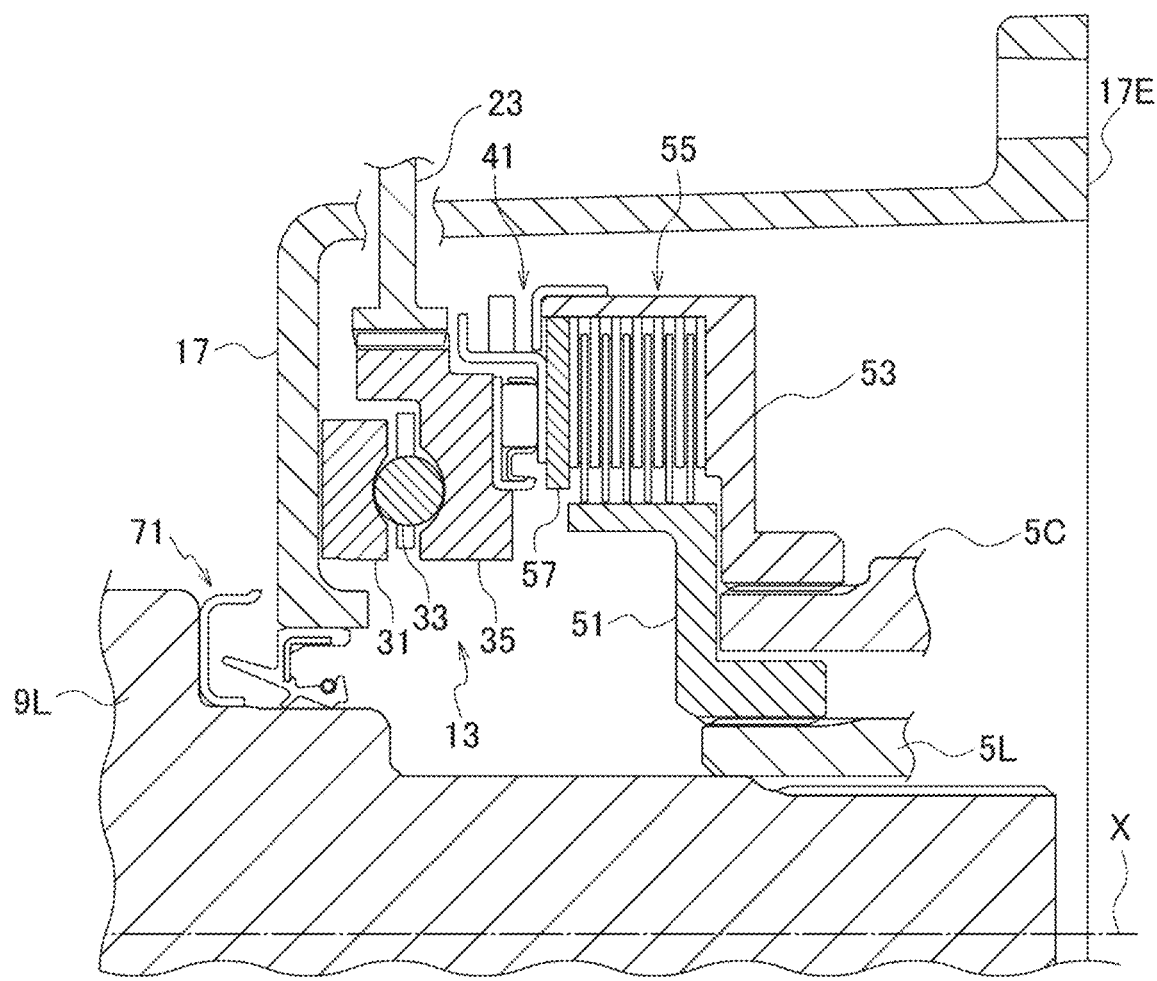
FIG. 4 is a sectional elevational view in which a part of a sub-assembly is enlarged based on another example.

The base member 31 is seated on and thus supported by a proper immovable member of the eAxle, namely its casing or a carrier of its planetary gear set for example. Or, the cam mechanism 13 may be arranged closer to the end wall of the cover 17 as compared with the clutch assembly 15 as shown in FIG. 4 and, in this arrangement, the base member 31 may be seated on the end wall. In any case, the base member 31 is made immovable both in the direction of the axis X and around the axis X. In contrast, the thrust member 35 is movable both in the direction of the axis X and around the axis X, and its outer periphery is provided with gear teeth to mesh with the wheel 23. As receiving the rotational force via this meshing relation from the actuator 11, the thrust member 35 rotates about the axis X and the cam balls 33 go up or down the grooves so that the cam mechanism 13 converts the rotational force generated by the actuator 11 into an axial thrust force.

While the above descriptions relate to the example using the cam balls 33, roller or any other rolling members may be used in place of the cam balls 33, or alternatively applicable are cam structures or ball screws that one or both of the members 31, 35 have. Further the base member 31 instead of the thrust member 35 may be in mesh with the wheel 23 and thereby rotate about the axis X and the thrust member 35 may be instead prevented from rotating. Any of these examples enables the cam mechanism 13 to convert the rotational force generated by the actuator 11 into the axial thrust force.

Figure 5:
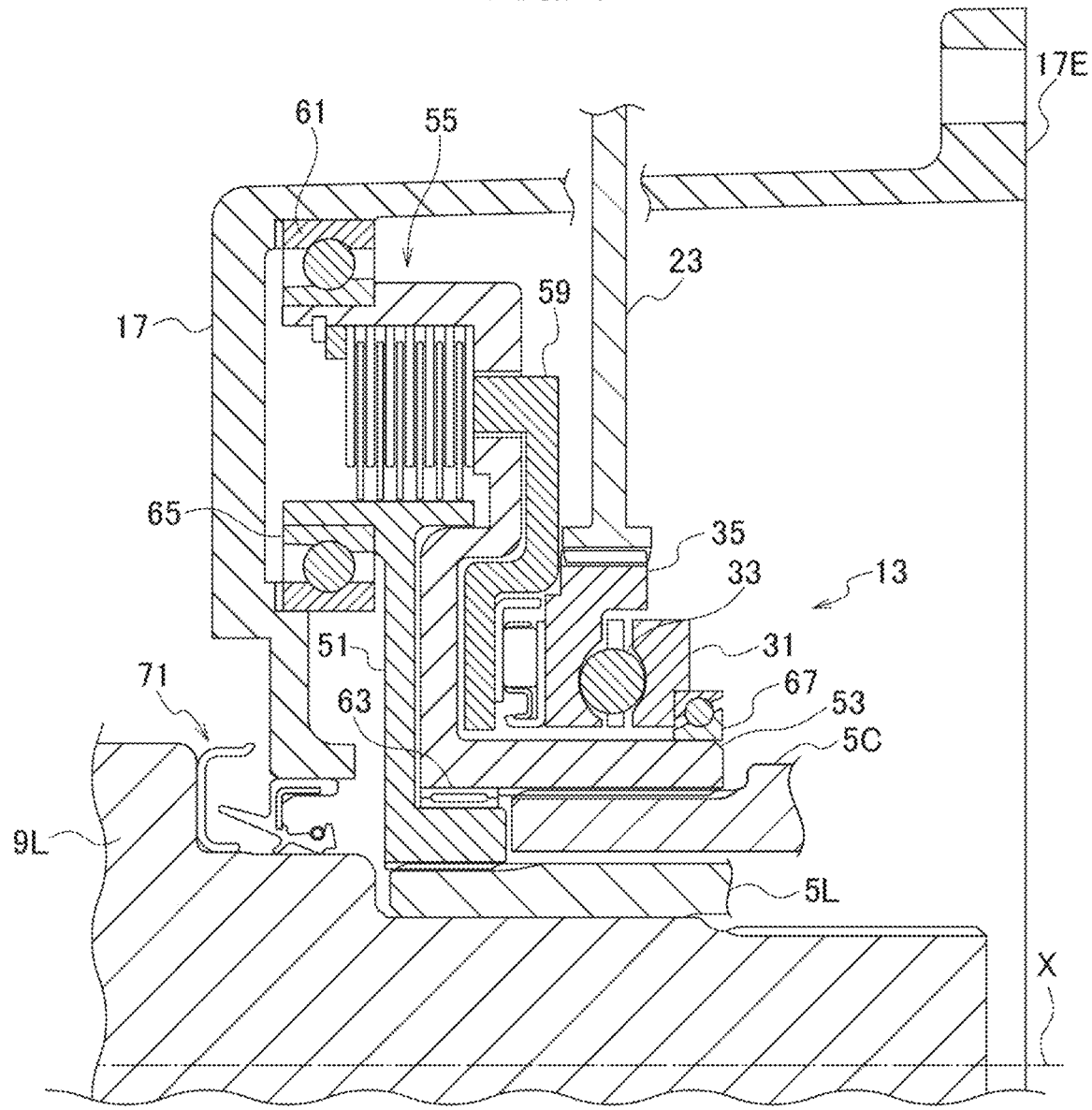
FIG. 5 is a sectional elevational view in which a part of a sub-assembly is enlarged based on yet another example.

The clutch assembly 15 is for example provided with an inner drum 51, an outer drum 53, and a friction clutch for frictionally braking the outer drum 53 relative to the inner drum 51. The inner drum 51, as shown in FIG. 3, drivingly engages with a differential case 5C of the differential 5. From the differential case 5C, a boss portion of the side gear 5L is led out, with which the outer drum 53 drivingly engages. The relation of the drums 51, 53 may be inverted, wherein the inner drum 51 may engage with the side gear 5L and the outer drum 53 may engage with the differential case 5C as shown in FIG. 4 or 5. Further, the boss portion may not be led out considerably and instead the clutch assembly 15 may intrude into the differential case 5C to establish engagement. For example, as shown in FIG. 4, the inner drum 51 may intrude into the differential case 5C to establish engagement with the side gear 5L. Moreover, this engaging section may radially overlap with the engaging section where the outer drum 53 engages with the differential case 5C. These arrangement is beneficial in reducing at least the axial size of the sub-assembly 7.

In any case, these engagements may be established by spline-coupling or keyway-coupling. Either the spline-coupling or the keyway-coupling can facilitate coupling and separation and nonetheless provides sufficient coupling strength for torque transmission, but is not indispensable. By such a coupling, when the friction clutch effects the braking ability, the side gear 5L is braked relative to the differential case 5C and thereby its differential motion therebetween is limited.

When the side gears 5R, 5L make a differential motion, a relative rotation according to the differential motion occurs between the inner drum 51 and the outer drum 53. Although not necessarily, a bearing 63 may be interposed between the drums 51, 53 as shown in FIGS. 3 and 5, and the bearing 63 may be a ball bearing or a needle bearing for example. Alternatively, in a case of an arrangement as shown in FIG. 4, a bearing may be interposed between the differential case 5C and the inner drum 51.

The friction clutch is a clutch for braking the differential motion between the drums 51, 53, and may be a multi-plate clutch provided with a plurality of clutch plates 55, one group of which drivingly couple with the inner drum 51 and another of which drivingly couple with the outer drum 53. These groups are alternately stacked and thus generate friction between the plates when a thrust force acts on the whole of the plates, thereby frictionally braking the outer drum 53 relative to the inner drum 51.

To receive the thrust force from the cam mechanism 13 and thereby come into action, as shown in FIGS. 2 and 3, the clutch assembly 15 is disposed so adjacent to the cam mechanism 13. Although the clutch assembly 15 may be disposed adjacent to the end wall of the cover 17, the cam mechanism 13 may be instead disposed adjacent to the end wall as described already with reference to FIG. 4. A bearing, although not shown in FIG. 4, may be interposed between the outer drum 53 and the cover 17 so as to support the back of the outer drum 53. This structure enables the cover 17 to bear the thrust force by the cam mechanism 13 and further facilitates alignment of the clutch assembly 15 with the axis X.

Alternatively, the clutch plates 55 are not necessarily disposed axially adjacent to the cam mechanism 13 but may, as shown in FIG. 5, for example, be disposed radially outward so that the clutch plates 55 and the cam mechanism 13 partly overlap with each other. This arrangement is beneficial in reducing at least the axial size of the sub-assembly 7.

In the example described above in FIG. 5, a mediation member 59 elongated radially outward along the outer drum 53 transmits the thrust force by the cam mechanism 13 to the clutch plates 55. The mediation member 59 is generally a disk around the axis X and is, on one face thereof, in contact with the thrust member 35. The other face is provided with one or more projections that penetrate the outer drum 53, and accordingly the outer drum 53 is provided with corresponding through-holes, so that the mediation member 59 transmits the thrust force by the cam mechanism 13 to the clutch plates 55. Needless to say, in between the thrust member 35 and the mediation member 59, a thrust bearing may be interposed.

Further, although not necessarily, a ball bearing 67 may be interposed in the cam mechanism 13, particularly between the base member 31 and the outer drum 53 for example. This is, along with the needle bearing 63, beneficial in aligning respective constituents with the axis X.

While the cam mechanism 13 as a whole is immovable around the axis X, the clutch assembly 15 along with the differential 5 rotates about the axis X. To allow both relative rotation and transmission of the thrust force, a thrust bearing 41 may be interposed therebetween. Further between the thrust bearing 41 and the clutch plates 55, a pressure plate 57 may be interposed in order to promote uniformity of thrust force application.

As will be readily understood, as the actuator 11 brings the cam mechanism 13 into action to exert the thrust force on the clutch assembly 15, the differential motion between the axles 9R and 9L becomes limited. The limiting ability increases when the thrust force increases in accordance with the input by the actuator 11, and the limiting ability decreases when the thrust force decreases.

The clutch assembly 15 is rotatably supported by the cover 17. To allow its rotation, a bearing 61 is interposed between the outer drum 53 and the cover 17 for example. The bearing 61 is, as well, preferably in contact with the back face of the outer drum 53 and also supported by the end wall of the cover 17, thereby bearing the thrust force. In FIGS. 2 and 3, the bearing 61 is drawn as a ball bearing but may be a roller bearing instead. Further, any of a radial bearing, an angular bearing and a thrust bearing is applicable. Further as shown in FIG. 5, a bearing 65 may be interposed between the inner drum 51 and the cover 17.

The cover 17 is generally a bowl- or pot-like container composed of a circumferential wall around the axis X and the end wall elongated from the circumferential wall toward the axis X, and is so dimensioned as to enclose the cam mechanism 13, the clutch assembly 15 and components related thereto. The cover 17, at the end section 17E thereof, combines or unites with the casing of the eAxle. Further, in the examples shown in FIGS. 3 and 5, the cover 17 is so dimensioned as to seat the base member 31 on a proper immovable member of the eAxle when combined or united together. Alternatively, in the example shown in FIG. 4, the outer drum 53 is seated on the immovable member with having a bearing such as a thrust bearing interposed therebetween. The immovable member is for example a casing of the eAxle or a carrier of its planetary gear set. Or, the cover 17 may have a structure for seating, on which the base member 31 or the bearing may be seated. Further, when coupled or united together, the inner drum 51 and the outer drum 53 respectively couple with the differential case 5C and the side gear 5L and the cover 17 covers these components as well. The end wall of the cover 17 has an opening 71 defining the axis X, through which the axle 9L is led into the cover 17 and coupled with the side gear 5L.

In the embodiments shown in FIGS. 3 and 5, the end wall of the cover 17, having the bearings 61 and 65 interposed, supports the clutch assembly 15 against the thrust force. As described already, as the cover 17, at the end section 17E at the opposite end, combines with the casing of the eAxle, resultantly the cover 17 and the casing in combination bear the thrust force. The thrust reaction force generated in a pair with the thrust force by the cam mechanism 13 is borne by the immovable body on which the base member 31 is seated. Further in the embodiment shown in FIG. 4, the end wall of the cover 17 supports the cam mechanism 13 against the thrust reaction force and the casing of the eAxle bears the thrust force which the clutch assembly 15 receives. More specifically, in any of the examples, the cover 17 coupled with the eAxle bears the thrust force and the thrust reaction force and therefore the vehicle body need not bear the thrust force and also need not require any structure for supporting any component against the thrust force. As will be readily understood from FIGS. 2 and 3, the sub-assembly 7 has a relatively small structure that projects slightly from the end of the differential 5. The vehicle would not require considerable design change even if the sub-assembly 7 incorporated in the eAxle were to be on board.

Figure 6A:
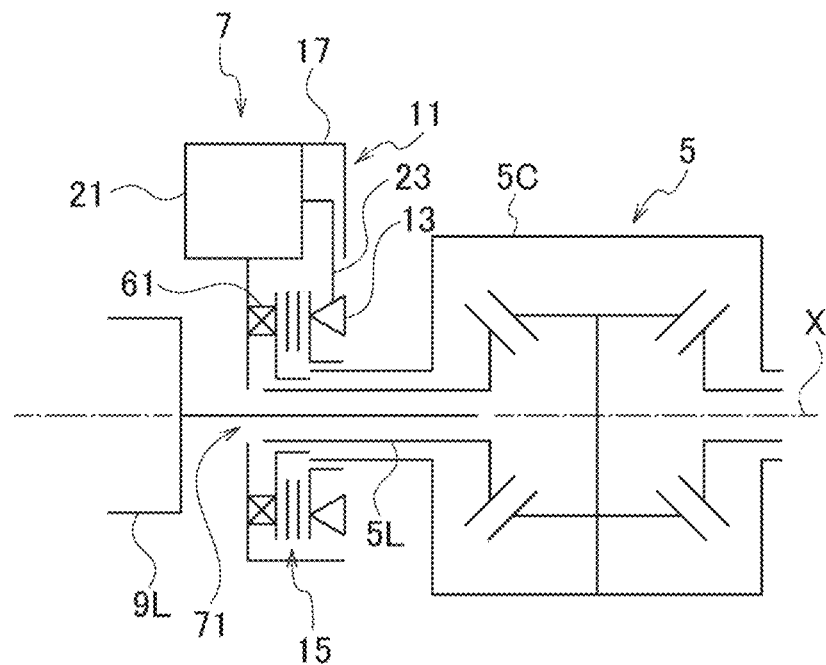
FIG. 6A is a block diagram of a sub-assembly based on one example.
Figure 6B:
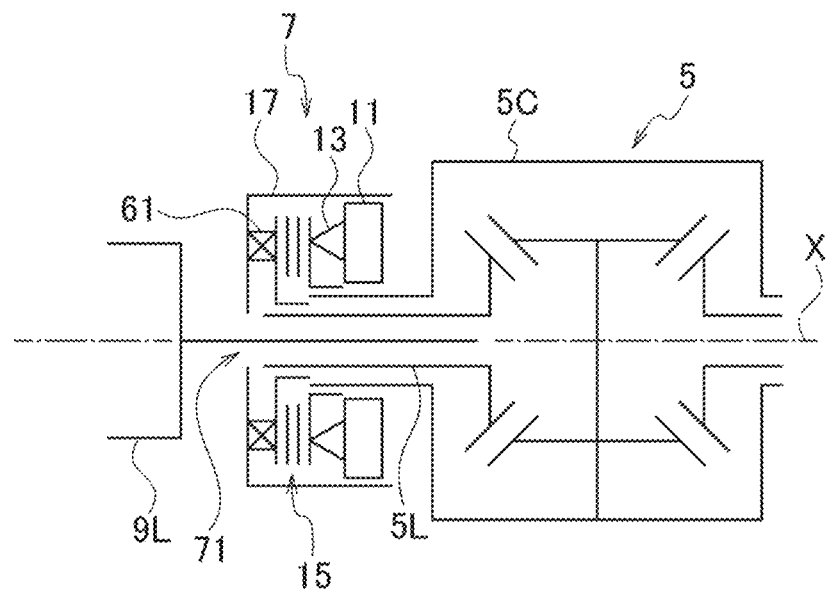
FIG. 6B is a block diagram of a sub-assembly based on another example.

Referring to FIG. 6A in combination with FIG. 2, 3 or 5, the actuator 11 is so supported by the cover 17 as to project radially outward relative to the axis X and uses the wheel 23 exposed to the interior of the cover 17 to transmit the rotation to the cam mechanism 13 in the aforementioned examples. In place of these structures, as schematically shown in FIG. 6B, the actuator 11 may be disposed in the cover 17. For example, an axially thin motor, such as an axial-gap motor, with a hollow output shaft may be applied to the actuator 11 and the output shaft may be directly coupled with the base member 31. This motor may be coaxial with the cam mechanism 13 and as well be interposed between the cam mechanism 13 and the eAxle. Although the axial size would increase, a radially more compact structure would be realized. In this case, in place of the base member 31, the actuator 11 may be seated on the eAxle and thereby the reaction force may be borne thereby. Further, in the motor, the side that faces the cam mechanism 13 may be a rotor rotating about the axis X and in this case the rotor may be directly coupled with the base member 31 or may double as the base member 31.

Figure 6C:
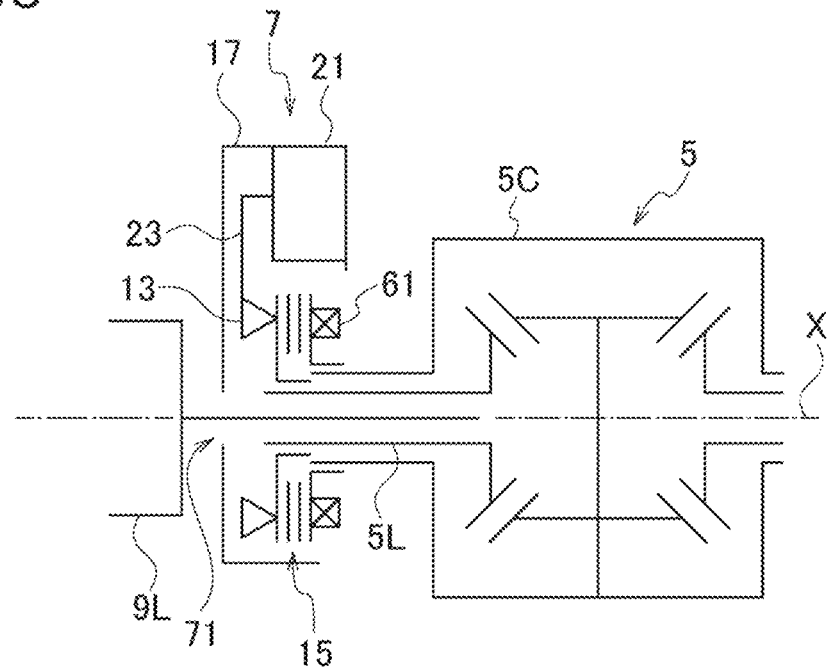
FIG. 6C is a block diagram of a sub-assembly based on still another example.

Further, in the structure exemplified in FIG. 6A, the cam mechanism 13 is at the side of the eAxle and the end wall of the cover 17 bears the thrust force, whereas the cam mechanism 13 may be disposed adjacent to and supported by the end wall of the cover 17, as shown in FIG. 6C in combination with FIG. 4 for example, and the thrust force may be directed to the differential 5 while acting on the clutch assembly 15. In this case, the base member 31 may be seated on the end wall of the cover 17 so that the thrust reaction force is borne by the end wall and the bearing 61 may be seated on the eAxle so that the thrust force is borne by the eAxle. Even in the structure exemplified in FIG. 6C, axial projection of the sub-assembly 7 is relatively short.

Figure 6D:
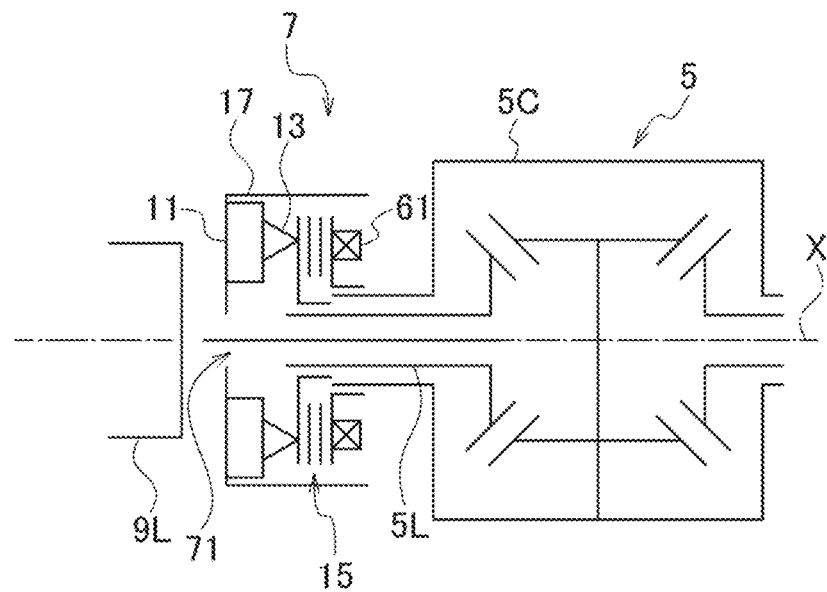
FIG. 6D is a block diagram of a sub-assembly based on the other example.

In the example where the cam mechanism 13 is disposed at the side of the end wall of the cover 17, as exemplarily shown in FIG. 6D, the actuator 11 may be disposed within the cover 17. In this case, the actuator 11 (motor) may be fixed to the end wall of the cover 17. The cam mechanism 13 is supported by the cover 17 with having the actuator 11 interposed therebetween. Although the axial size would increase, a radially more compact structure would be realized.

Use of the sub-assembly according to any of the examples described above will readily impart a function of limiting differential motion to an eAxle. Because the sub-assembly need not be incorporated into the eAxle, it does not give rise to axial size increase of the eAxle and therefore design change about the vehicle body is not required. The sub-assembly coupled with the eAxle can, nevertheless, be handled unitarily and its handling does not inherently differ from handling of the eAxle alone. It facilitates assembly of a vehicle as with a conventional eAxle. On the other hand, as the sub-assembly alone can be separated from the eAxle, it facilitates maintenance.

Although certain exemplary embodiments are described above, modifications and variations of the embodiments will occur to those skilled in the art, in light of the above teachings.

What is claimed is:

1. A sub-assembly for limiting differential motion to an electric axle (eAxle) with a differential configured to differentially output torque about an axis, comprising:
    an actuator configured to generate a rotational force about the axis;
    a cam mechanism configured to convert the rotational force into a thrust force in a direction of the axis;
    a clutch assembly including a first drum and a second drum each separably combinable with the differential, and a friction clutch arranged between the first drum and the second drum, the clutch assembly being disposed adjacent to the cam mechanism so as to receive the thrust force to bring the friction clutch into action;
    a cover configured to enclose the cam mechanism and the clutch assembly and to combine with the eAxle to support any one of the cam mechanism and the clutch assembly against the thrust force or a thrust reaction force; and
    a mediation member arranged between the cam mechanism and the second drum, the mediation member configured to transfer the thrust force from the cam mechanism to the friction clutch, and wherein the mediation member includes a projection and the second drum includes a through-hole, the projection being arranged in the through hole and configured to contact the friction clutch.

2. The sub-assembly of claim 1, wherein the actuator is coupled with the cam mechanism to transmit the rotational force.

3. The sub-assembly of claim 2, wherein the actuator is interposed between the cam mechanism and the cover.

4. The sub-assembly of claim 2, wherein the actuator is fixed to the cover.

5. The sub-assembly of claim 1, wherein the cam mechanism is interposed between the clutch assembly and the differential.

6. The sub-assembly of claim 1, wherein the friction clutch is a multi-plate clutch including first clutch plates engaged with the first drum and second clutch plates engaged with the second drum and stacked alternately with the first clutch plates.

7. The sub-assembly of claim 1, wherein the first drum and the second drum respectively include splines configured to couple with the differential, the splines overlapping with each other in a radial direction.

8. The sub-assembly of claim 1, wherein the friction clutch is configured to brake the differential motion between the first drum and the second drum.

9. The sub-assembly of claim 1, wherein the cam mechanism includes a base member and a thrust member, the thrust member being moveable along the axis and the base member being immovable along the axis.

10. The sub-assembly of claim 9, wherein the thrust member is coupled with the actuator and is rotatable about the axis.

11. The sub-assembly of claim 1, wherein the friction clutch is radially offset relative to the cam mechanism.

* * * * *